3,515,023
SHEAR BLADES FOR CUTTING METAL
SHEETS OR PLATES
Josef Schiffers, Monchen-Gladbach-Rheindahlen, Germany, assignor to Schloemann Aktiengesellschaft, Dusseldorf, Germany, a company of Germany
Filed May 8, 1968, Ser. No. 727,572
Claims priority, application Germany, May 11, 1967, Sch 40,693
Int. Cl. B26d *1/00;* B23d *35/00*
U.S. Cl. 83—698                              5 Claims

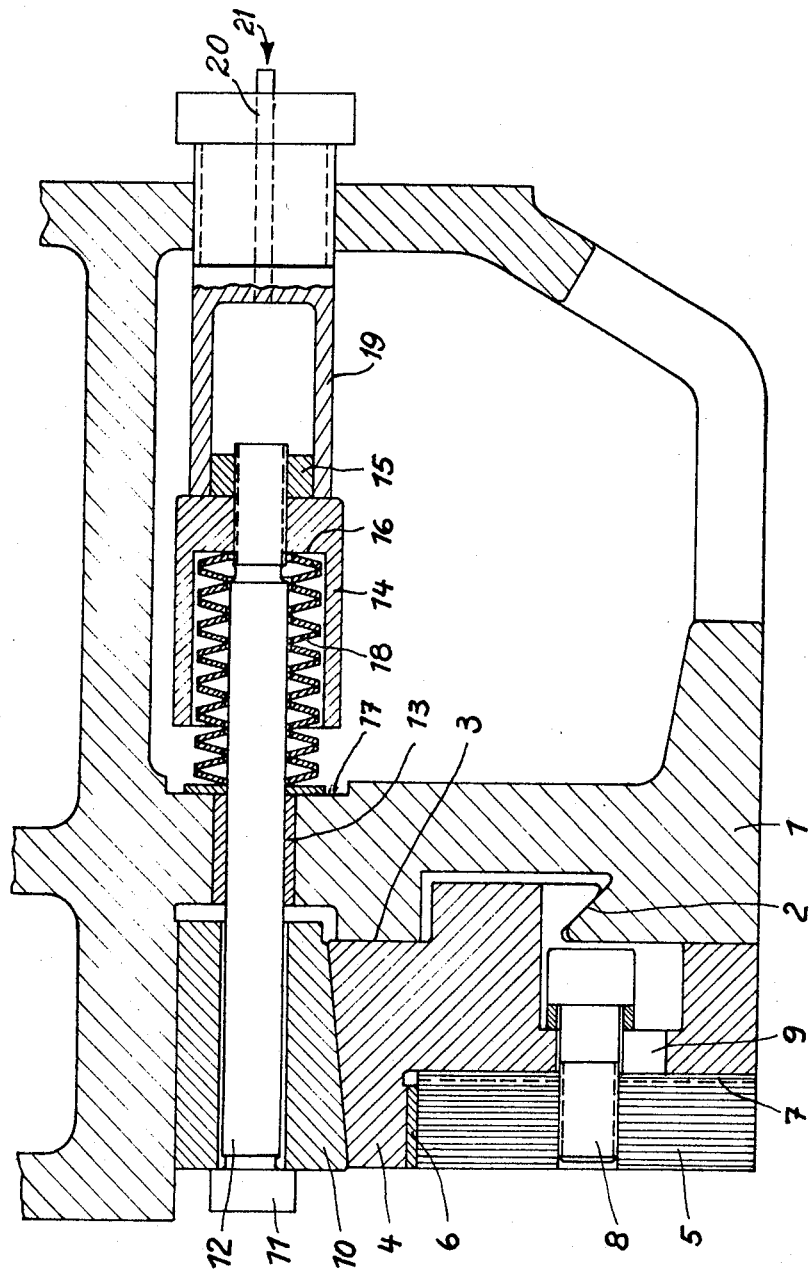

ABSTRACT OF THE DISCLOSURE

In shears for cutting metal sheets or plates, a shear-blade mounting wherein a cutting blade is connected with a filler bar to form a cutter block, which is fitted into an angular recess, preferably dovetail-shaped with a surface inclined at an angle of 45°, in the shear saddle, one or more transverse wedges, held by displaceable clamping bolts bearing resiliently against the shear saddle, with their wedge surfaces pressed against the cutter block so as to keep the inclined surface in the recess of the shear saddle in contact with the abutting surface of the filler bar.

---

This invention relates to a shear blade for cutting metal sheets or plates, wherein the cutting blade is mounted in a filler bar to form a cutter-block, and the latter is inserted in an angular recess in a shear saddle.

Shear blades of this kind, as is known, have the advantage that the adjusting of the cutting blades on the shear saddle itself can be avoided, which already brings with it a considerable saving of time, above all in connection with the correctly positioned arrangement of the blade beams, the losses of cross-section of which, occasioned by re-grinding, must be counterbalanced by spacing members or the like It has however, been found that the known screw bolts connecting the cutter block with the blade-holder still leads to disturbing interruptions of operation, the duration of which results in an appreciable drop in production, particularly on account of the poor accessibility of the screw connections The object of the present invention is to provide a shear blade of the kind described above, in which the changing of the cutter block on the shear saddle can be successfully carried out in a considerably shorter time, and with substantially less manual labour. This is attained, according to the invention, by arranging, between the cutter block and the shear saddle, one or more wedges extending transversely to the longitudinal direction of the blade, these wedges, with the aid of displaceable clamping bolts bearing resiliently on the shear saddle, being pressed with their wedge surfaces against the cutter block in such a way that they hold the latter in an abutting position against inclined surfaces provided on the shear saddle in an angular recess thereof.

The wedges are preferably provided with a bolt bearing with a widened head on the base surface thereof, this bolt being guided through the shear saddle, and carrying on its inner end a hood adapted to be clamped in various positions. Between the inner end of the bolt and the rear side of the shear saddle is arranged a set of annular cup springs. In this way a pressure fluid can be supplied to the external end face of the hood, whereby compressing the cup springs, and relaxing the positive hold of the wedge.

With a shear blade designed in this way the expenditure of time for the exchanging of the cutter blocks, which, with a continuous method of working, is unavoidable at intervals of a few hours, is reduced to a minimum. One can therefore make considerably better use, than was possible with the kinds of connection hitherto known between the cutter block and the shear saddle, of the advantage obtainable by pre-mounting the cutter blocks in a workshop operation with accurately positioned cutting blades.

The invention will now be further described with reference to the accompanying drawing, showing one embodiment by way of example.

The drawing shows a cross-section through the upper cutter block and its fastening to the shear saddle in the case of an ordinary shear blade. The shear saddle 1 has an angular recess, for the accommodation of the cutter block to be hereinafter described. This angular recess has two pressure-applying surfaces 2 and 3, against which a filler bar 4 is pressed with corresponding pressure-applying surfaces. The surface 2 is inclined at an angle of 45°, so that a force acting vertically from above upon the filler bar 4 will tend to push the filler bar 4 into the shear saddle 1. Since however, the surface 3 extends vertically, the depth of penetration of the filler bar into the shear saddle is limited, so that the lower edges of the filler bar 4 and the shear saddle 1 are flush with one another. Since moreover the cutting blade 5, by the use of spacing members 6 and 7, is fitted into the filler bar 4 in the correct position, a clean collective closure of all the lower edges is ensured. For the securing of the cutting blade 5 in the filler bar 4, screws 8 are employed, which penetrate into elongated holes 9 provided in the filler bar, in such a way that some vertical displacement corresponding to the use of thicker spacing members 6 is possible. The arangement consisting of the filler bar, the screws, the cutting blade and the spacing members, forms collectively the exchangeable cutter block, which can therefore be prepared in advance in a workshop in the manner described.

Above the filler bar 4 are provided clamping wedges 10, on the front surface of which bears the head 11 of a bolt 12, which pases through the filler bar. The bolt 12 is guided, within the shear saddle 1, by a guiding bush 13, whereby canting is obviated. At the inner end of the bolt 12 there is a hood 14, which can be clamped in different positions, and which may for instance be screwed on, and secured by means of a lock-nut 15. Between the inner end 16 of the hood 14 and the corresponding rear face 17 of the shear saddle, there extends a set of cup springs 18, by which the bolt, and therefore also the wedge 10, are maintained under tension. When the cutter block is to be dismantled, it is only necessary to play upon the end face of the hood 14 with a fluid under pressure, whereby the cup springs are compressed. The bolt head 11 is thereby released from the front surface of the wedge 10, so that the latter is loosened, and the cutter block can be taken out. This can be effected, in the case of transverse shearing, by running the cutter block out as a whole in its longitudinal direction. In the case of border shearing and the like, owing to the limited space conditions, dismantling is effected in a transverse direction.

Instead of the multiple clamping wedges described above, it is also possible to work with a continuous bar-shaped wedge.

A solution which is constructionally particularly simple may be obtained by constructing the lock-nut 15, which is secured to the guiding bolt 13, as a piston which is slidable in a cylinder 19, and is actuated by pressure fluid admitted to the cylinder 19 in the direction 21 through a duct 20.

Where space conditions are particularly restricted, actuation with a pressure fluid may alternately be effected laterally, beside the hood. In this case, pressure appliances act directly upon the wedge or wedges, through the shear saddle, which is pierced for the purpose.

I claim:
1. A shear blade mounting for shears for cutting metal sheets or plates, comprising: a shear saddle formed with an angular recess having an inclined surface, and a cutter block adapted to be mounted in the shear saddle, the cutter block consisting of: a filler bar adapted to be fitted into the angular recess in the shear saddle, a cutting blade, and screw means securing the cutting blade to the filler bar, and the mounting, further comprising: at least one wedge extending transversely to the longitudinal direction of the cutting blade, interposed between the filler bar and the shear saddle, displaceable clamping bolts extending through the wedge and through the shear saddle, and spring means causing the wedge to bear resiliently against the shear saddle and to press with a wedge surface against the cutter block, thereby keeping the cutter block in an abutting position against the inclined surface in the angular recess of the shear saddle.

2. A shear-blade mounting as claimed in claim 1, the said screw means comprising: at least one bolt having a widened head bearing against the external surface of the wedge, and a hood on the inner end of the bolt, and the said spring means comprising: annular cup springs surrounding the shank of the bolt and interposed between the inner end of the hood and the adjacent surface of the shear saddle, and a lock-nut meshing with the thread of the bolt and bearing against the outer end of the hood.

3. A shear-blade mounting as claimed in claim 2, further comprising: means for applying fluid pressure to the outer end face of the hood so as to compress the cup springs, thereby releasing the pressure of the bolt head against the wedge.

4. A shear-blade mounting as claimed in claim 1, the recess in the shear blade being of dovetail shape, with its inclined surface at an angle of forty-five degrees, and the filler bar having a surface inclined at the same angle for engagement therewith.

5. A shear-blade mounting as claimed in claim 1, further comprising: packing pieces adapted to be inserted between the cutting blade and the filler bar, and screw bolts extending through the cutting blade and the filler bar to hold them firmly together, the filler bar being formed with vertically elongated bolt holes for the passage of these bolts.

References Cited
UNITED STATES PATENTS

| 2,107,581 | 2/1938 | Parsons et al. | 83—698 X |
| 3,046,825 | 7/1962 | Thompson | 83—698 |
| 3,358,542 | 12/1967 | Murray | 83—698 X |

FRANK T. YOST, Primary Examiner